(12) United States Patent
Tyrrell

(10) Patent No.: US 11,445,721 B2
(45) Date of Patent: Sep. 20, 2022

(54) HUNTING BLIND INTEGRATED WITH A TRAILER

(71) Applicant: Scott Tyrrell, Rapid City, SD (US)

(72) Inventor: Scott Tyrrell, Rapid City, SD (US)

( * ) Notice: Subject to any disclaimer, the term of this patent is extended or adjusted under 35 U.S.C. 154(b) by 0 days.

(21) Appl. No.: 17/516,896

(22) Filed: Nov. 2, 2021

(65) Prior Publication Data

US 2022/0192176 A1 Jun. 23, 2022

Related U.S. Application Data

(63) Continuation of application No. 17/516,031, filed on Nov. 1, 2021, now abandoned.

(60) Provisional application No. 63/181,521, filed on Apr. 29, 2021, provisional application No. 63/129,873, filed on Dec. 23, 2020.

(51) Int. Cl.
  *B60P 3/34* (2006.01)
  *B60P 3/42* (2006.01)
  *A01M 31/02* (2006.01)

(52) U.S. Cl.
  CPC .......... *A01M 31/025* (2013.01); *B60P 3/34* (2013.01); *B60P 3/42* (2013.01)

(58) Field of Classification Search
  CPC .......... B60P 3/34; B60P 3/42; A01M 31/025
  See application file for complete search history.

(56) References Cited

U.S. PATENT DOCUMENTS

| | | | | |
|---|---|---|---|---|
| 4,123,869 A * | 11/1978 | Witt | ...................... | A01M 31/00 428/919 |
| 4,794,717 A * | 1/1989 | Horsmann | .......... | A01M 31/025 135/901 |
| 5,295,555 A * | 3/1994 | Strange | ..................... | E06C 5/04 182/116 |
| 5,297,844 A * | 3/1994 | Haustein | .............. | B62D 33/044 182/116 |
| 5,339,852 A * | 8/1994 | Bull | .................... | A01M 31/025 135/124 |
| 5,906,217 A * | 5/1999 | Hill | ......................... | E04H 15/48 135/124 |
| 6,290,023 B1 * | 9/2001 | Martin | .................... | B60P 3/341 182/127 |
| 7,188,635 B2 * | 3/2007 | Johnson | ................ | A01M 31/02 135/87 |
| 8,777,254 B1 * | 7/2014 | Fowler | ................. | A01M 31/025 280/656 |
| 9,630,666 B1 * | 4/2017 | Keene | ................. | A01M 31/025 |
| 2006/0260871 A1 * | 11/2006 | Davis | ......................... | E06C 5/02 182/127 |
| 2007/0074933 A1 * | 4/2007 | Kerns | ................. | A01M 31/025 182/127 |
| 2009/0236179 A1 * | 9/2009 | Lopez | .................... | A01M 31/02 182/63.1 |
| 2011/0005561 A1 * | 1/2011 | Noll | ...................... | E04H 15/001 135/121 |

(Continued)

*Primary Examiner* — Gregory A Blankenship
(74) *Attorney, Agent, or Firm* — Bacon & Thomas, PLLC

(57) ABSTRACT

A hunting blind is integrated with a trailer to enable the trailer to be towed to a hunting site and used for hunting, without the need to remove the hunting blind from the trailer. The hunting blind also accommodates and conceals equipment such as an ATV or UTV. The blind includes two levels, with openings in each level, and may be configured to resemble a stack of hay bales.

14 Claims, 5 Drawing Sheets

(56) References Cited

U.S. PATENT DOCUMENTS

| | | | | |
|---|---|---|---|---|
| 2012/0216845 A1* | 8/2012 | Noll | ................... | E04H 15/001 |
| | | | | 135/124 |
| 2013/0087178 A1* | 4/2013 | Atherton | ............... | E04H 15/001 |
| | | | | 135/88.05 |
| 2014/0034101 A1* | 2/2014 | Rowley | ................. | E04H 15/001 |
| | | | | 135/143 |
| 2014/0345660 A1* | 11/2014 | McInerney | ........... | E04H 15/001 |
| | | | | 135/121 |
| 2015/0282475 A1* | 10/2015 | Harris | ................. | A01M 31/025 |
| | | | | 52/173.1 |
| 2016/0286729 A1* | 10/2016 | Alldredge | ............... | A01F 25/08 |
| 2017/0335561 A1* | 11/2017 | Wickramasekera | ...... | B60P 3/34 |
| 2018/0363318 A1* | 12/2018 | Johnson | ................... | E04H 15/44 |
| 2019/0350191 A1* | 11/2019 | No L | ........................ | E06B 3/38 |
| 2019/0364879 A1* | 12/2019 | McLeod | ............. | A01M 31/025 |
| 2020/0391650 A1* | 12/2020 | Leishman | ................. | B60P 3/39 |

* cited by examiner

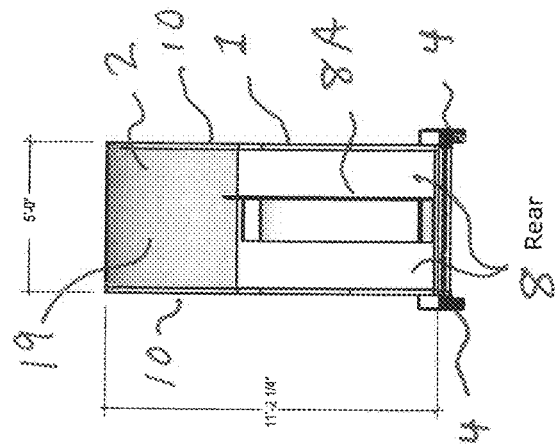
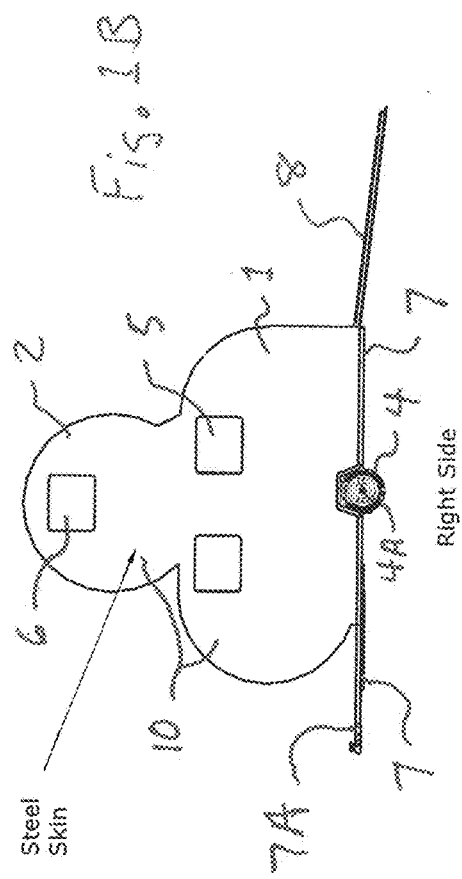
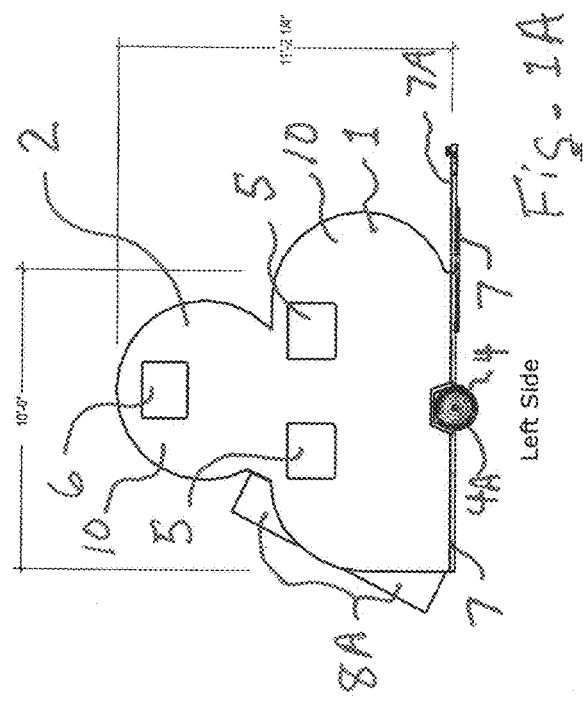
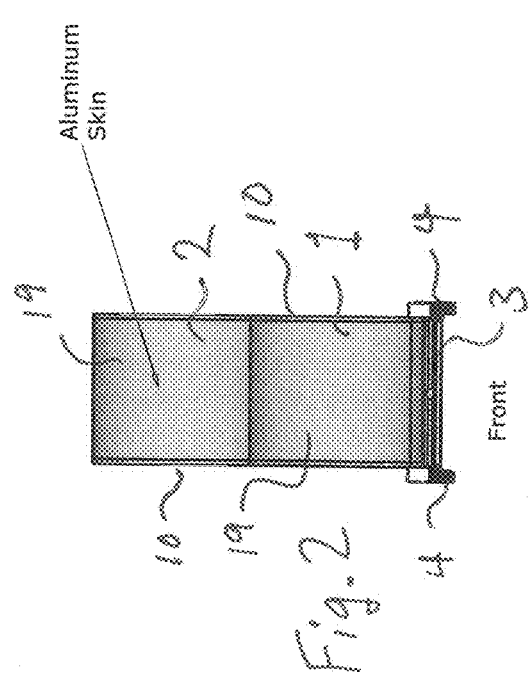

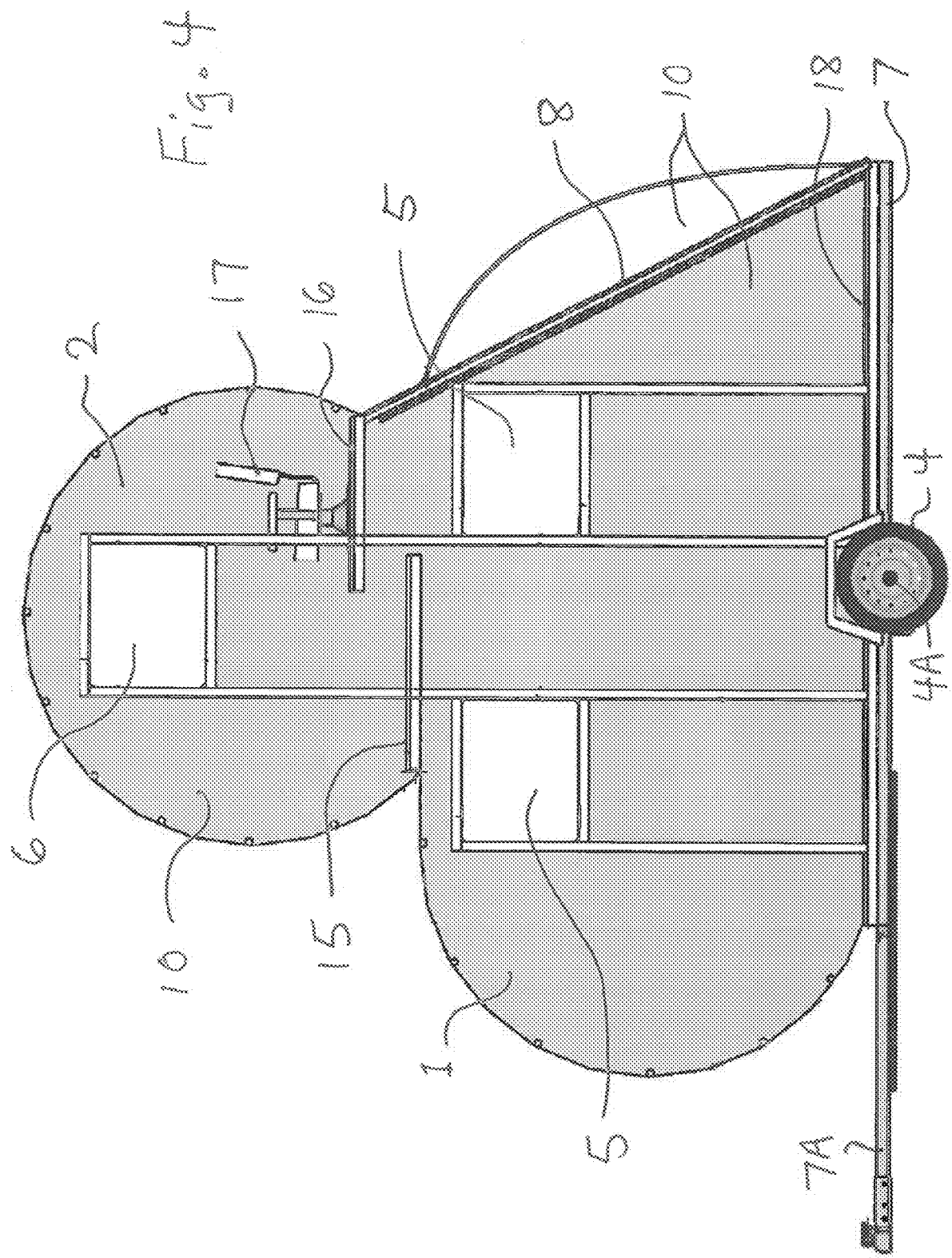

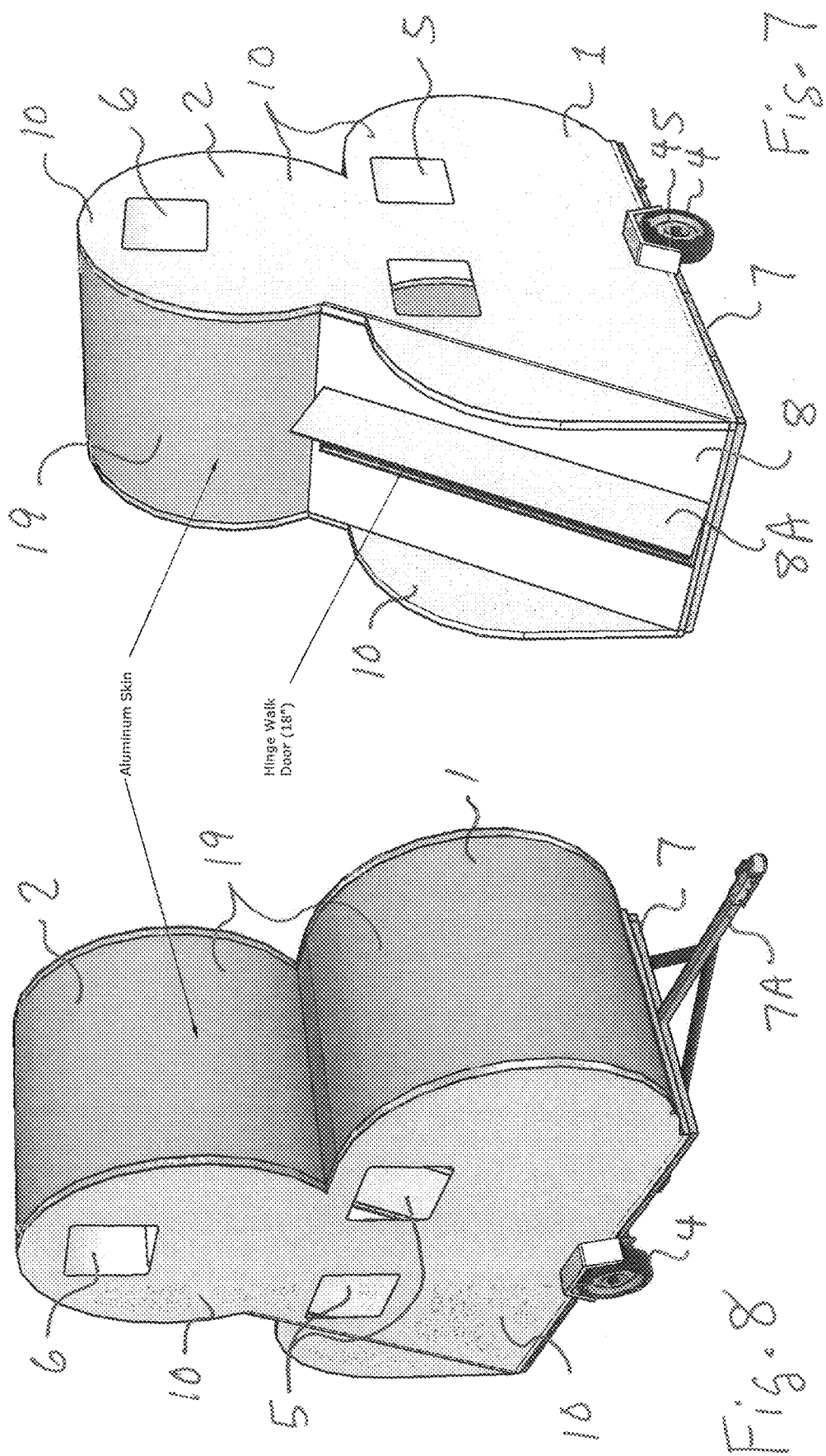

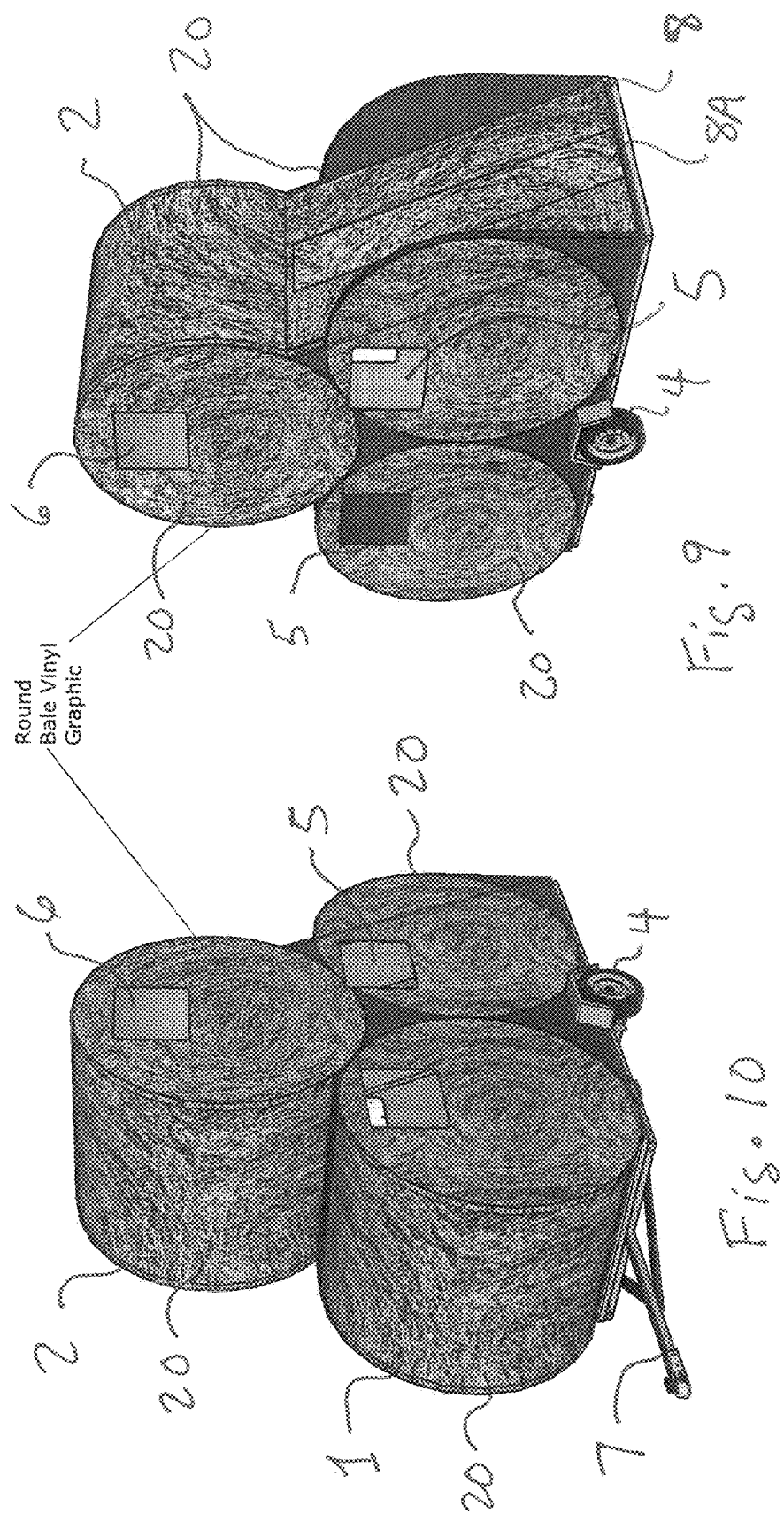

HUNTING BLIND INTEGRATED WITH A TRAILER

This application is a continuation of U.S. patent application Ser. No. 17/516,031, filed Nov. 1, 2021, and claims the benefit of U.S. Provisional Appl. Ser. No. 63/129,873, filed Dec. 23, 2020, and 63/181,521, filed Apr. 29, 2021, each of which is incorporated herein by reference.

BACKGROUND OF THE INVENTION

1. Field of the Invention

The invention relates to a hunting blind, and in particular to a hunting blind integrated with a trailer to enable the hunting blind to be towed to a hunting site and used without the need for on-site assembly or removal of the blind from the trailer.

The invention also relates to a hunting blind that doubles as a transport trailer for an all-terrain vehicle (ATV), utility terrain vehicle (UTV), or other equipment.

In a preferred embodiment of the invention, the hunting blind includes a trailer bed and two levels configured to resemble a stack of rolled hay bales or otherwise camouflaged to conceal the hunting blind and/or that is non-threatening to wildlife. The first level is able to accommodate and conceal equipment such as an ATV or UTV, while the second level serves as a raised or elevated hunting blind.

2. Description of Related Art

Hunting blinds are well-known, commercially available structures whose exterior is covered with a material having a natural appearance, such as textured and painted vinyl or burlap, that can conceal the presence of a human for the purpose of big game hunting, wild fowl hunting, predator hunting, scouting, or just to provide a dry, comfortable place to enjoy and observe or film nature. The blind is designed to resemble an object found in nature or that is non-threatening to wildlife, so that the wildlife will not be deterred from approaching the blind while pursuing their normal activities.

Hunting blinds can be semi-permanent or permanent structure erected at the location of use, or arranged to be disassembled for transport and re-assembled at the hunting site. A common configuration is for the structure's exterior to resemble a large, rolled hay bale. Deer, turkey, and other animals adapt almost immediately to hay bale blinds when setting up. Even in areas where they are not used to seeing hay bales, there is something about the seemingly natural material and shape that do not make wildlife nervous.

A problem with the conventional hunting blind structures is that assembly on-site can be difficult or time-consuming, while transport, removal from the vehicle, and placement of a complete structure is difficult for any structure large enough to comfortably accommodate a person. Not only is it difficult to transport the structure, but placement of the structure in the back of a pick up truck or trailer limits the number or type of additional equipment that can be transported. Additional equipment that a person might wish to transport includes vehicles such as ATVs or UTVs.

Ideally, it would be most convenient if the hunting blind could be transported to the location of use and left on the trailer, but conventional trucks and trailers do not resemble hay bales or any other natural object and therefore are likely to scare away any wildlife and prevent use of the blind structure for hunting.

SUMMARY OF THE INVENTION

It is a first objective of the invention to provide a hunting blind that can be transported to a hunting site and used for hunting or wildlife observation without removal from the transport vehicle or trailer, the transport vehicle or trailer and hunting blind being integrated and configured to present a natural appearance that is non-threatening to wildlife.

It is a second objective of the invention to provide a portable hunting blind that allows transport of the hunting blind and additional equipment to a hunting site while using the same transport vehicle.

It is a third objective of the invention to provide a hunting blind that accommodates at least one person and additional hunting equipment, and that also provides an elevated platform for hunting.

These objectives are achieved, in accordance with the principles of a preferred embodiment of the invention, by a hunting blind that is integrated with, or assembled or built onto a flat trailer bed, so that the combined structure resembles a natural object that is non-threatening to game or wildlife. In an exemplary embodiment, the hunting blind is a hay bale blind, i.e., a structure whose exterior resembles a stack of large, rolled, bales of hay, although it is within the scope of the invention to configure the exterior as another natural object or structure that is non-threatening to wildlife. For example, the exterior of the structure may be covered with a vinyl wrap having a camouflage pattern.

The hunting blind of the preferred embodiment is preferably in the form of a two story structure, with the first story being arranged to accommodate and hide large equipment such as an ATV or UTV, and the second story serving as an elevated platform that accommodates one or more persons. The second story may be accessed by a ladder.

The hunting or hay bale blind of the preferred embodiment may be towed to the hunting location, and used while still on the trailer bed. In a particularly advantageous but non-limiting embodiments, an ATV or UTV may be stored in the blind during towing, and taken out for scouting, or used to tow the trailer to the hunting location and then stored in the trailer during hunting.

BRIEF DESCRIPTION OF THE DRAWINGS

FIGS. 1A and 1B are respective left and right side views of a portable hunting blind constructed in accordance with the principles of a preferred embodiment of the invention.

FIG. 2 is a front end view of the portable hunting blind of FIG. 1.

FIG. 3 is a rear end view of the portable hunting blind of FIG. 1.

FIG. 3 is perspective view, taken from behind, showing details of the portable hunting blind of FIGS. 1 and 2.

FIG. 4 is side view corresponding to the right side view of FIG. 1, showing the portable hunting blind of FIGS. 1-3, with one of the side panels removed to show an interior of the hunting blind.

FIG. 7 is a perspective view, taken from the rear, of the hunting blind of FIG. 1, in which a rear loading ramp is in a raised state and a rear walk-in door has been opened.

FIG. 8 is a perspective view, taken from the rear, corresponding to the perspective view of FIG. 9 with the rear ramp/door panel in a lowered state.

FIGS. 9 and 10 are perspective views, taken respectively from the rear and front, of the hunting blind shown in FIGS. 6 and 7, to which graphic sheets have been added to complete a camouflage effect.

DETAILED DESCRIPTION OF THE PREFERRED EMBODIMENTS

Figure 5:
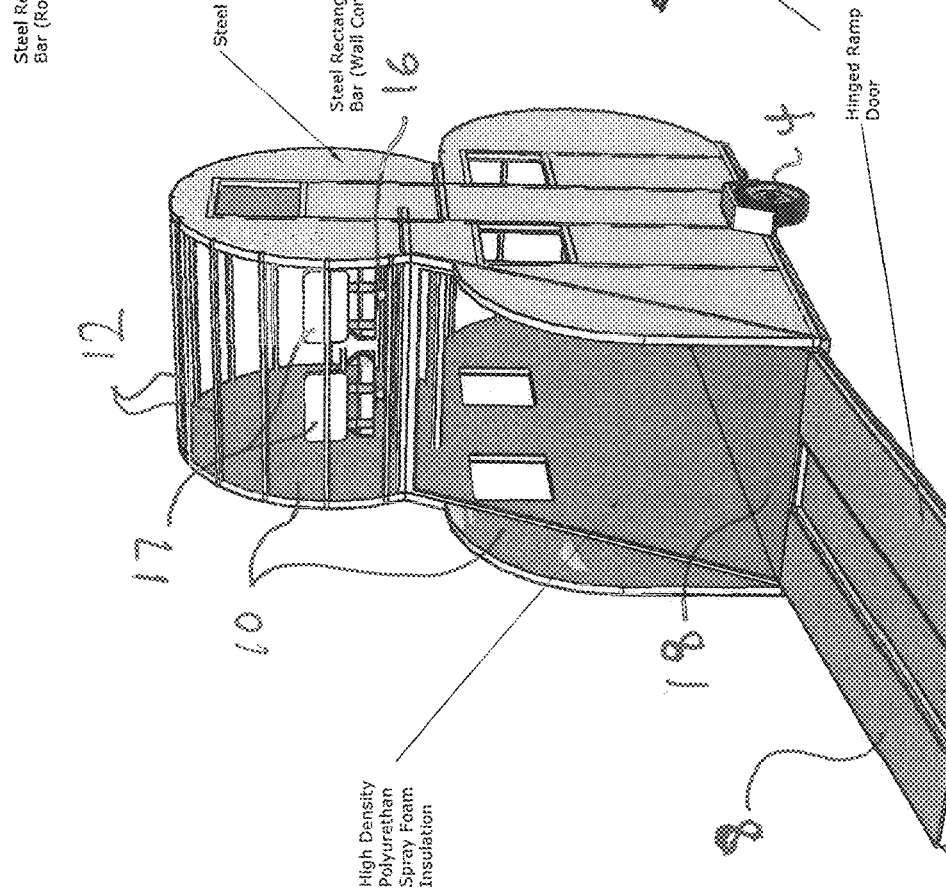
FIG. 5 is a perspective view, taken from the rear, showing the portable hunting blind of FIG. 1 in an intermediate construction state in which side panels separated by framing have been secured to a trailer bed.

As shown in FIGS. 1-4, the portable hunting blind of the preferred embodiment of the invention is a two story structure. The first story, level 1, includes the bed of the trailer and can serve as a storage space for an ATV, UTV, or other equipment, and/or as a blind for one or two hunters, while the second story, level 2, extends from the first story and is separated from the first story by a floor and/or platform, visible in FIGS. 5-7, that supports at least one hunter. The trailer 7 is fitted in conventional fashion with single or double axles 3, and wheels/tires 4 mounted on hubs 4A (hubs 4A are shown in FIGS. 4 and 5). The bed of the trailer 7 may include hooks or other fastening arrangements (not shown) to secure the ATV or STV.

In the illustrated embodiment, level 1 includes two lower openings 5 on each side while level 2 includes one upper opening 6 on each side. It will be appreciated, however, that level 1 and/or level 2 may have numbers of openings that are different than the illustrated number of openings, and that the openings 5 and 6 may be provided on just one side of the respective lower level 1 or upper level 2. Furthermore, the openings 5 and/or 6 may optionally include flaps or panels that serve as closures for the openings during transport or storage of the hunting blind or when the hunting blind is not in use.

Figure 6:
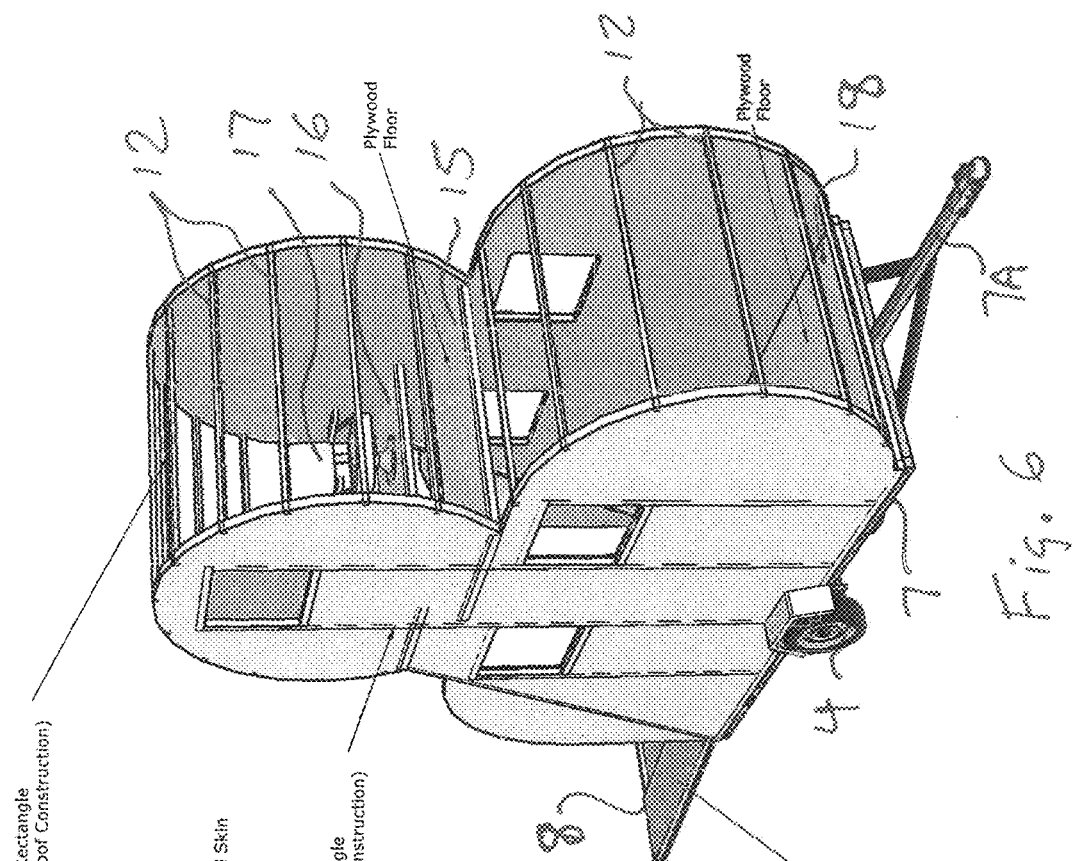
FIG. 6 is a perspective view, taken from the front, of the intermediate construction state of FIG. 4.

According to one illustrative construction, best seen in FIGS. 5-7, the lower level 1 and upper level 2 are constructed of side panels 10 that extend the height of the hunting blind and form respective left and right side walls of both the upper and lower levels 1,2, and that are separated and supported by horizontal crossbars, struts, or framing members 12 extending between the side panels 10. Side panels 10 and framing members 12 also support a platforms 15 and 16 that separate the lower and upper levels 1,2, and that provide a floor for a person within the blind, as well as support for optional chairs 17 fixed to the platform 16 for the upper level 2. An additional platform 18 may be secured to the trailer 7 to form a floor of the first level 1. Except in the area of a raised ramp 8, as described below, the ends and top of the hunting blind may be covered by a sheet material 19 that is fastened to the framing members 12 to complete the enclosure.

Side panels 10 and framing members 12 may, by way of example and not limitation, be made of steel. Platforms 15, 16, and 18 may be made of plywood, while end panels 19 may advantageously consist of or include aluminum sheets. However, It will be appreciated that any of the materials described herein may be replaced by other suitable materials without departing from the scope of the invention, and that the invention is not to be limited to specific materials except as required by the appended claims.

In order to complete the hunting blind, a vinyl wrap 20 is secured to the sides and top of the blind. The vinyl wrap is preferably provided with a camouflage pattern or other natural looking coloring or texture. By way of example and not limitation, the vinyl wrap may be colored and/or textured to resemble hay, and arranged to conceal the occupants of the blind from animals, so that the animals are not threatened by their presence and will approach the blind. The wrap may also assist in containing the scent of any humans present in the hunting blind.

Alternatively, materials other than vinyl may be used as the wrap to form the exterior of the blind. The materials should be lightweight to facilitate transport, and the sides of the hunting blind should at least resemble a natural material, and preferably provide protection for occupants of the hunting blind from wind and rain.

Although the illustrated embodiment is a hay bale blind, it is within the scope of the invention to configure the exterior of the blind, both with respect to shape and color or texture, to resemble objects other than rolled hay bales. For many applications, the shape of the blind may not be as important as color or texture, and therefore the hunting blind may have a variety of different shapes, so long as the hunting blind does not appear threatening to the game or animals for which the hunting blind is intended to be used.

Dimensions of the trailer/hunting blind may be as follows:

Level 1 may have a maximum length on the order of 120 inches from front to rear, while the maximum height of the hunting blind may be approximately 100 to 120 inches from the bed of the trailer to the top of level 2. Upper and lower openings 5 and 6 may be approximately 18 to 20 inches in height, with a spacing between windows on the first level of approximately 20 to 30 inches. The exemplary distance from the bed of the trailer to bottom of the lower windows, and from the floor of the second level to the bottom of the upper windows, may be chosen to be approximately 30 to 40 inches. These dimensions are selected to enable a hunter to aim and fire a rifle or arrow through the openings, but are presented by way of example only, and may be varied without departing from the scope of the invention.

In order to enable the blind to be transported on a highway, the trailer needs to be outfitted with lights (not shown) and a hitch or coupling such as the illustrated trailer hitch 7A to couple the trailer 7 with a towing vehicle.

As best illustrated in FIGS. 3, 5, 7, and 9, the rear of the blind should be provided with a ramp 8 for loading or unloading the ATV or STV, a door 8A that provides access to the hunting blind when the ramp 8 is pivoted to a closed position, an optional upper back door hatch 9, and a ladder (now shown) to enable a person to climb up to the upper level 2. In addition, either of the levels may be provided with storage compartments (not shown), with the storage compartments on the lower level being positioned at the front of the trailer. The ramp 8 and the door 8A may respectively be made, by way of example and not limitation, of steel and/or plywood and steel panels, and covered with vinyl wrap material 20 as shown in FIGS. 9 and 10.

The exemplary hunting blind of FIGS. 1-3 may be constructed by initially installing side panels 10 to extend vertically from sides of the trailer 7, the panels 10 being separated and positioned by the horizontal framing members 12. The side panels 10 define the sides of both of the levels 1 and 2, include cutouts for the upper and lower openings 5 and 6, and may be cut from a single sheet or consist of two or more sheets joined together.

Instead of steel, side panels 10 may alternatively be made of wood, drywall, plywood, particle board, or any suitable rigid construction material. In addition, each of the side panels 10, framing members 12, sheet material 19, and platforms 15, 16, and 18 may be painted, coated, or finished as desired to improve their appearance and provide insulation or weatherproofing. For example, high density polyurethane spray foam insulation may be applied to the inside of side panels 10.

Having thus described a preferred embodiment, it is to be understood that the invention is not to be limited by the details of the illustrated embodiments, but rather is intended to encompass any modifications or variations that may occur to those skilled in the art based on the above description. As a result, the invention is intended to be limited only by the scope of the appended claims.

What is claimed is:

1. A hunting blind, comprising:
    a trailer bed supported by at least one axle and wheels, and a coupler configured to enable the trailer to be towed;
    a blind structure extending from the trailer bed,
    wherein the blind structure includes upper and lower levels, the upper level including a floor configured to support at least one person, and each of the upper and lower levels including at least one opening,
    wherein the lower level includes space for storage and transport of equipment, and
    wherein the blind structure includes an outer wrap that conceals the at least one person and the equipment so that the blind structure appears non-threatening to selected animals, thereby enabling the at least one person within the structure to hunt or observe the animals,
    wherein the equipment includes an all-terrain vehicle (ATV) or utility terrain vehicle (UTV), and the lower level includes a ramp for loading and unloading the ATV or UTV,
    wherein the ramp is pivotal from an open position that enables the ATV or UTV to be driven into the blind structure to a closed position in which the ramp forms an end wall of the blind structure, and
    wherein the blind structure includes side panels that form side walls of the upper and lower levels and are fixed to the trailer bed, a frame consisting of crossbars extending between the side panels and supporting at least one platform between the upper and lower levels, and sheets fixed to the crossbars that, together with the ramp, enclose front and rear ends of the blind structure.

2. A hunting blind as claimed in claim 1, wherein the outer wrap is made of a vinyl material that camouflages the hunting blind.

3. A hunting blind as claimed in claim 1, wherein each level is configured to resemble a rolled hay bale.

4. A hunting blind as claimed in claim 3, wherein the outer wrap is made of a vinyl material.

5. A hunting blind as claimed in claim 1, wherein the openings are dimensioned to allow a hunter to aim and fire a rifle or bow through a respective opening when supported by the trailer bed or the floor.

6. A hunting blind as claimed in claim 5, wherein two said windows are provided on each side of the lower level and one window is provided on each side of the upper level.

7. A hunting blind as claimed in claim 1, wherein the upper level is accessible by a ladder.

8. A hunting blind, comprising:
    a trailer bed supported by at least one axle and wheels, and a coupler configured to enable the trailer to be towed;
    a blind structure extending from the trailer bed,
    wherein the blind structure includes upper and lower levels, the upper level including a floor configured to support at least one person, and each of the upper and lower levels including at least one opening,
    wherein the lower level includes space for storage and transport of equipment, and
    wherein the blind structure includes an outer wrap that conceals the at least one person and the equipment so that the blind structure appears non-threatening to selected animals, thereby enabling the at least one person within the structure to hunt or observe the animals,
    wherein the equipment includes an all-terrain vehicle (ATV) or utility terrain vehicle (UTV), and the lower level includes a ramp for loading and unloading the ATV or UTV,
    wherein the ramp is pivotal from an open position that enables the ATV or UTV to be driven into the blind structure to a closed position in which the ramp forms an end wall of the blind structure, and
    wherein the ramp includes a hinged walk-in door through which a hunter enters the lower level of the blind when the ramp has been pivoted to a closed position.

9. A hunting blind as claimed in claim 8, wherein the outer wrap is made of a vinyl material that camouflages the hunting blind.

10. A hunting blind as claimed in claim 8, wherein each level is configured to resemble a rolled hay bale.

11. A hunting blind as claimed in claim 10, wherein the outer wrap is made of a vinyl material.

12. A hunting blind as claimed in claim 8, wherein the openings are dimensioned to allow a hunter to aim and fire a rifle or bow through a respective opening when supported by the trailer bed or the floor.

13. A hunting blind as claimed in claim 12, wherein two said windows are provided on each side of the lower level and one window is provided on each side of the upper level.

14. A hunting blind as claimed in claim 8, wherein the upper level is accessible by a ladder.

\* \* \* \* \*